(12) United States Patent
Pollard

(10) Patent No.: US 11,460,931 B2
(45) Date of Patent: Oct. 4, 2022

(54) RECOVERING PERSPECTIVE DISTORTIONS

(71) Applicant: Hewlett-Packard Development Company, L.P., Spring, TX (US)

(72) Inventor: Stephen Pollard, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/056,442

(22) PCT Filed: Oct. 31, 2018

(86) PCT No.: PCT/US2018/058458
§ 371 (c)(1),
(2) Date: Nov. 18, 2020

(87) PCT Pub. No.: WO2020/091764
PCT Pub. Date: May 7, 2020

(65) Prior Publication Data
US 2021/0263597 A1    Aug. 26, 2021

(51) Int. Cl.
| | | |
|---|---|---|
| G06F 3/03 | (2006.01) |
| G06T 7/593 | (2017.01) |
| G06T 7/187 | (2017.01) |
| H04N 13/207 | (2018.01) |
| H04N 13/239 | (2018.01) |
| G06K 9/62 | (2022.01) |
| H04N 5/225 | (2006.01) |

(52) U.S. Cl.
CPC ......... *G06F 3/0317* (2013.01); *G06K 9/6201* (2013.01); *G06T 7/187* (2017.01); *G06T 7/593* (2017.01); *H04N 5/2256* (2013.01); *H04N 13/207* (2018.05); *H04N 13/239* (2018.05)

(58) Field of Classification Search
CPC .............................. G06F 3/0446; G06F 3/0445
See application file for complete search history.

(56) References Cited

U.S. PATENT DOCUMENTS

| | | | |
|---|---|---|---|
| 6,978,040 B2 | 12/2005 | Berestov | |
| 8,204,307 B2 | 6/2012 | Lapstun et al. | |
| 8,493,482 B2 | 7/2013 | Cote et al. | |
| 8,773,513 B2 | 7/2014 | Ding et al. | |
| 9,928,420 B2 | 3/2018 | Kirk et al. | |
| 2002/0196238 A1* | 12/2002 | Tsukada | G06F 3/0482 345/173 |

(Continued)

*Primary Examiner* — Nan-Ying Yang
(74) *Attorney, Agent, or Firm* — HP Inc. Patent Department

(57) ABSTRACT

A method for recovering perspective distortion of a coded dot pattern on a surface, comprises generating a stereo-pair of images of a portion of the coded dot pattern, the stereo-pair of images comprising an overlap region comprising a subset of dots of the coded dot pattern that are common to the stereo-pair of images, selecting, in one image of the stereo-pair of images, a focus pattern from the subset of dots, determining a set of potential matches for the focus pattern in the other image of the stereo-pair of images, for each potential match, determining a set of additional dots of the coded dot pattern consistent with a single plane, and selecting a single plane with the highest number of consistent matched dots.

18 Claims, 16 Drawing Sheets

(56) References Cited

U.S. PATENT DOCUMENTS

| | | |
|---|---|---|
| 2004/0165054 A1* | 8/2004 | Saquib .................. B41J 2/5056 347/211 |
| 2008/0193053 A1* | 8/2008 | Lapstun ................ G06F 3/0321 382/321 |
| 2009/0309844 A1* | 12/2009 | Woo ........................ H01J 11/12 345/173 |
| 2012/0063672 A1 | 3/2012 | Gordon et al. |
| 2012/0237140 A1 | 9/2012 | Lapstun et al. |
| 2013/0095920 A1 | 4/2013 | Patiejunas et al. |

* cited by examiner

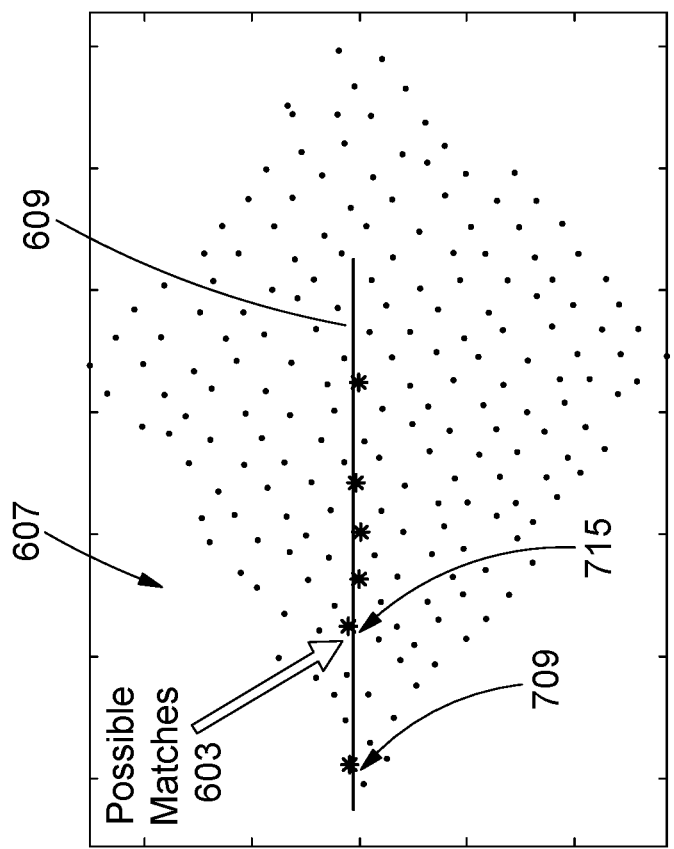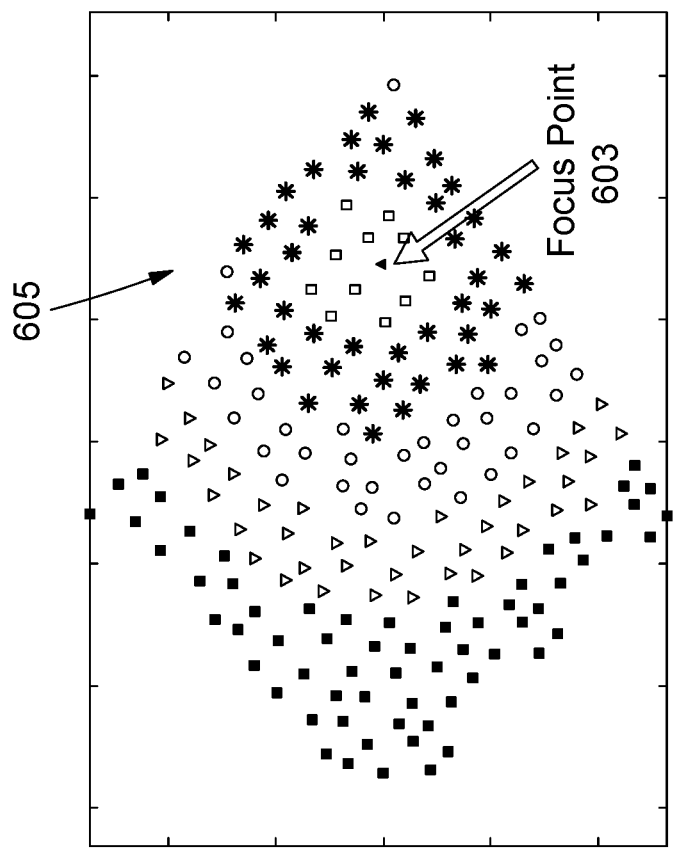
Figure 6

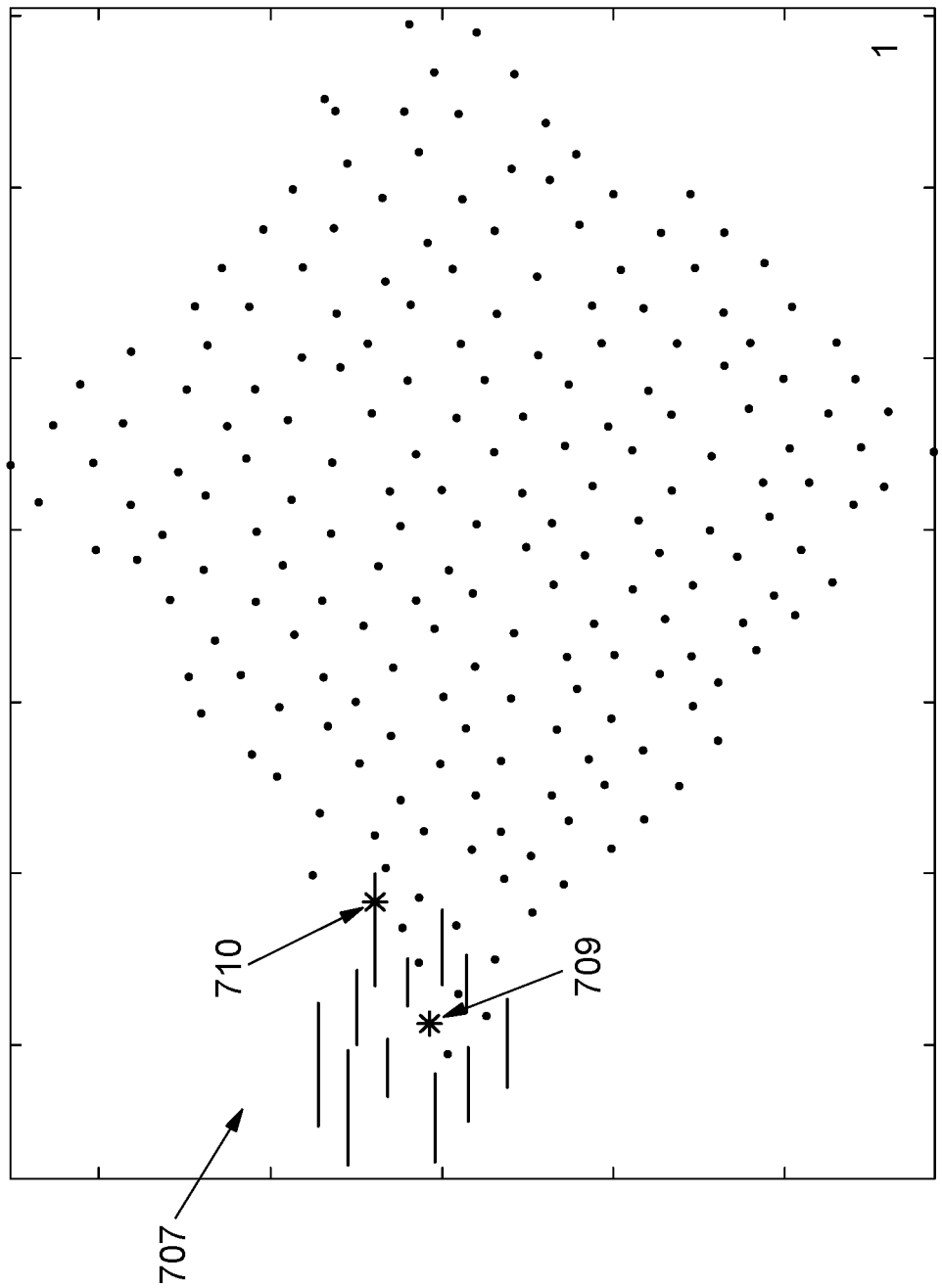

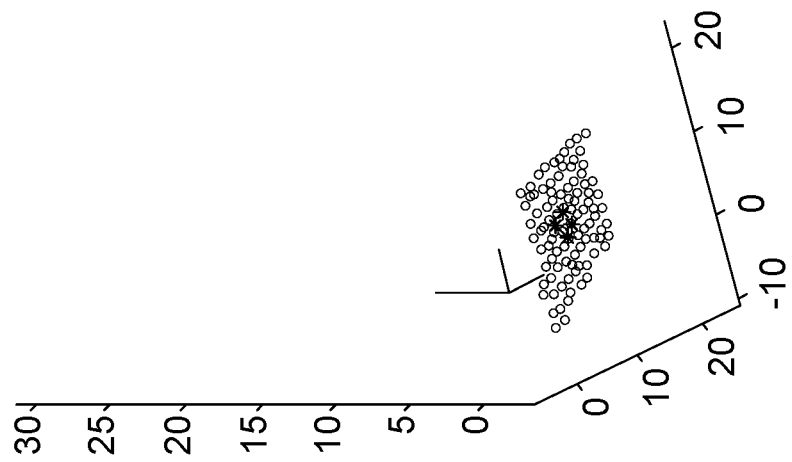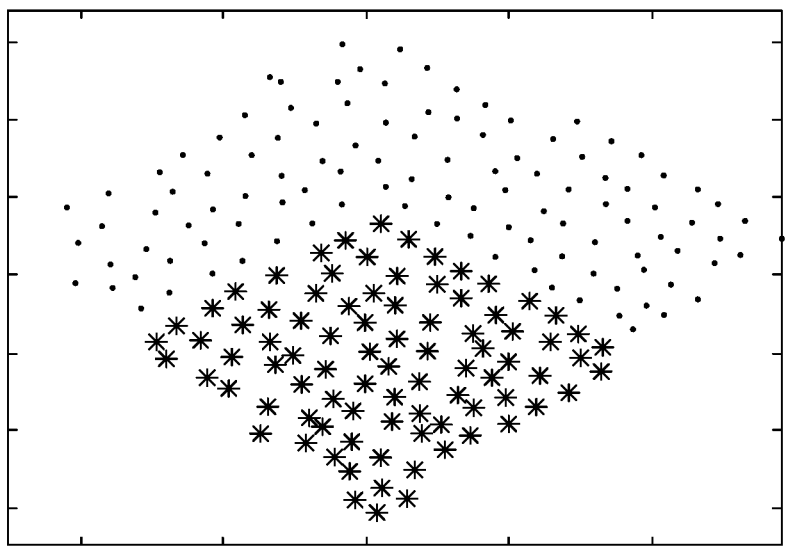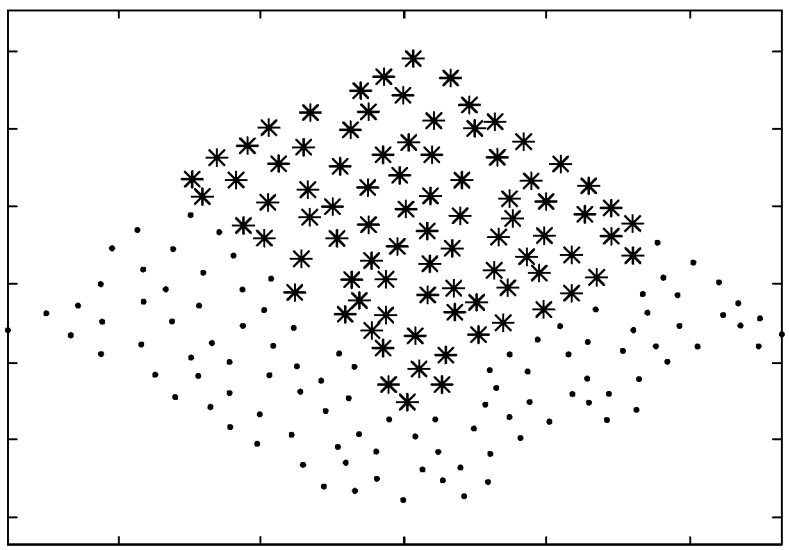
Figure 8

RECOVERING PERSPECTIVE DISTORTIONS

BACKGROUND

A digital pen/stylus apparatus or opto-electronic pen can use a pattern of non-repeating dots or marks on a surface in order to determine the position of the nib of the apparatus on or relative to the surface. For example, 'smart' paper and pen combinations enable a user to capture handwritten data in a digital form. Such systems can also be used on display surfaces using, for example, infra-red dots.

BRIEF DESCRIPTION OF THE DRAWINGS

Various features of certain examples will be apparent from the detailed description which follows, taken in conjunction with the accompanying drawings, which together illustrate, by way of example only, a number of features, and wherein:

FIG. 6 is a schematic representation illustrating a focus pattern and its evolving context for support resulting in efficient disparity-plane recovery according to an example;

FIGS. 7a-g are schematic representations of an initial disparity plane support process which uses the most immediate neighbourhood of the focus pattern, according to an example;

FIG. 8 is a schematic representation of the final selected sets of corresponding dots consistent with a single plane and the reconstructed depth plane with respect to a Euclidean world coordinate frame according to an example;

DETAILED DESCRIPTION

Figure 1:
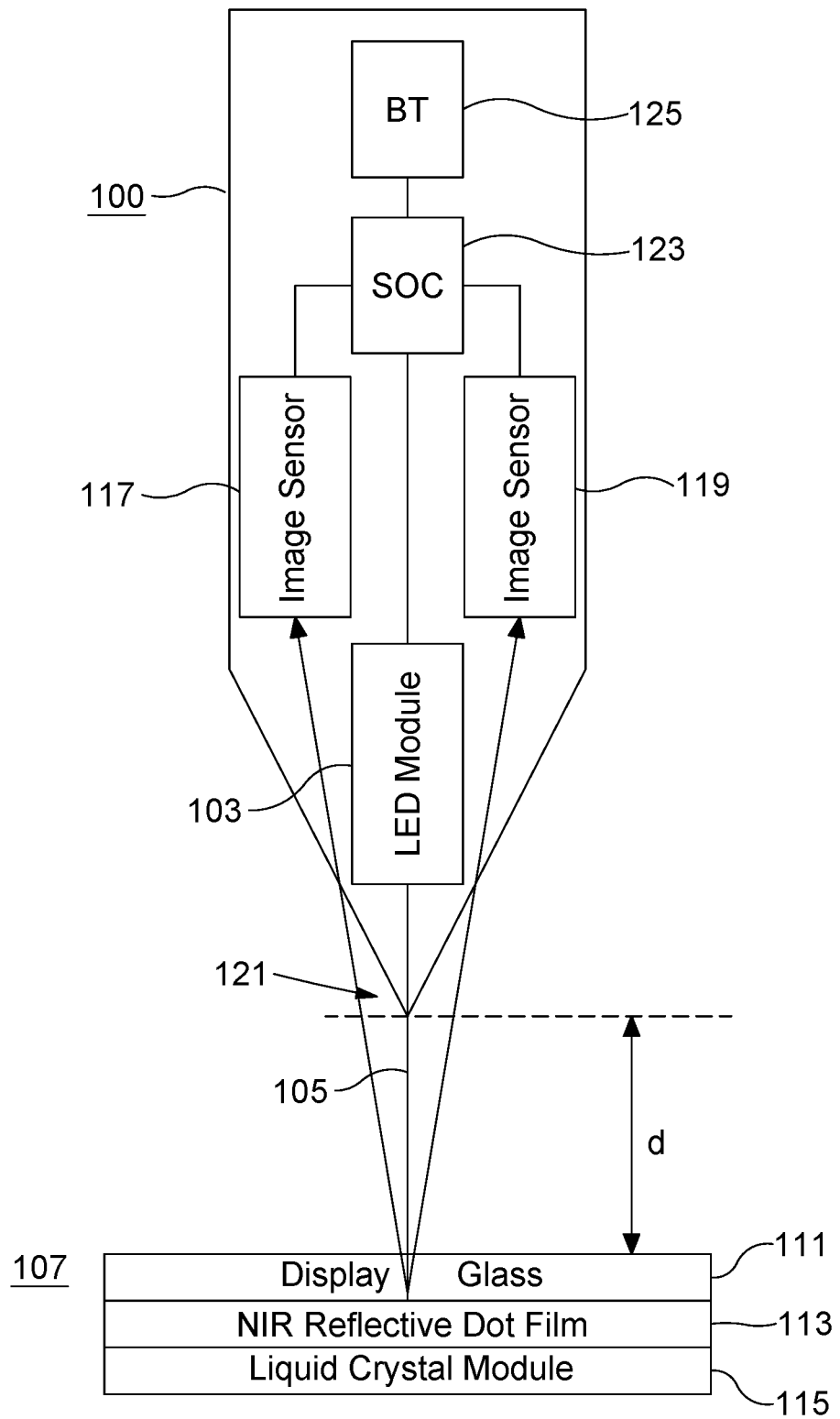
FIG. 1 is a schematic representation of an optoelectronic pen apparatus according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In a system comprising a digital pen/stylus or opto-electronic pen apparatus, the pen apparatus can image a portion of a surface using an onboard image sensor. The surface can be an interactive/digital paper surface, upon which a pattern of non-repeating dots is printed or otherwise deposited, or a display surface in which a pattern of non-repeating dots or marks can be provided on a portion or layer of the display using IR ink for example.

In either example, an image of a portion of the surface captured using the sensor enables some of the dot pattern to be used to uniquely identify the position coordinates of the pen apparatus in relation to the surface. For example, a page number, and a nib position on that page can be determined. Typically, this is achieved by firstly decoding a set of reference dots of a reference grid within the field of view of the sensor, and using these to decode 'data dots' that are disposed within the reference grid, which data dots encode a unique position.

Since the pen apparatus will almost always be presented to the surface in question at an angle, recovering an initial perspective in order to enable the reference grid to be determined is computationally intensive, requiring appropriate hardware in the pen apparatus.

According to an example, there is provided a stereo imaging method that separates perspective distortion recovery from dot decoding.

An optoelectronic pen apparatus according to an example can generate a stereo-pair of images of a portion of a coded dot pattern. Stereo imaging can be used to recover the relative orientation of the plane of the paper/screen surface relative to the pen apparatus in order that the underlying image data can be rectified to a fronto-planer representation of known scale. This representation can then be interrogated to recover the coded spatial information (data dots) that encodes the position of the pen apparatus relative to the surface.

In an example, the code can be represented as an N×N (e.g., N=6) window/page of dots that encode both x and y position and a page number. These windows can be tiled across a surface (document or display for example) to uniquely determine a macro position estimate. The micro position within the window/page is then determined using the known geometry of the nib of the pen apparatus with respect to the calibrated stereo system. This allows a position estimate to be made even when the pen apparatus is hovering above the surface.

According to an example, the stereo-pair of images generated by a pen apparatus can be generated using a pair of image sensors or a single image sensor with optics arranged to generate a pair of sub-images.

Note that, in the examples depicted in the figures, in order to demarcate dots that may be from one image or another for example, or dots that represent certain selections and so on, dots may be represented, for reasons of clarity, as other features, such as stars, boxes, crosses, circles and so on. It will be appreciated that this is simply to aid intelligibility of the figures and enable certain aspects to be more clearly distinguished from one another.

FIG. 1 is a schematic representation of an optoelectronic pen apparatus (or, more generally, a contact probe) comprising a pair of image sensors according to an example. The pen apparatus 100 comprises an LED module 103 to illuminate a surface 107. In the example of FIG. 1, the LED module 103 is configured to generate a near infrared beam 105 to illuminate a display surface 107. In the example of FIG. 1, the surface 107 comprises, amongst other possible layers, a display cover glass layer 111, a near infrared (NIR) dot film 113 upon which the dot pattern is provided, and a liquid crystal module 115. Note that the surface 107 depicted in FIG. 1 is not part of the pen apparatus 100.

A pair of image sensors 117; 119 are arranged on either side of the body of the pen apparatus 100. In an example, the image sensors may be mounted obliquely to maintain a central nib 121 location for the pen apparatus 100.

The NIR beam 105 illuminates the dot pattern on film 113, and respective images are captured by the image sensors 117, 119. System-on-a-chip (SOC) 123 can receive data representing the images and process it as will be described in more detail below in order to recover the relative orientation of the plane of the paper/screen surface relative to the pen apparatus in order that the underlying image data can be rectified to a fronto-planer representation of known scale. A short-range radio-frequency transceiver 125 can be provided to enable to the pen apparatus 100 to send and receive data. In an example, distance d from the nib of the pen apparatus to the surface may be up to around 10-15 mm, and down to zero (i.e. nib in contact with surface). For a paper-based surface, the dot pattern can be printed in white space regions. Alternatively, the surface can be entirely covered in dots, and content can later be printed on top of the dot pattern.

As noted above, a stereo-pair of images may also be generated using one image sensor. For example, two subportions of the image sensor can be used to effectively capture two images using an appropriate optical arrangement to from different centres of projection for each portion. For example, a mirror or pentaprism arrangement can be provided in place of one of the image sensors of the apparatus of FIG. 1 in order to reflect an image onto one image sensor, which image sensor can be configured to generate alternate images (such as one from light directly incident on the sensor, the other from light reflected from the mirror/prism).

In another example, a pair of apertures (bi-iris) can be used in front of the sensor. To prevent overlap, there can be a baffle (orthogonal to the baseline between the centres) between them. Alternatively, with a colour sensor for example, the apertures could have colour filters to match those of the sensor. They could also be time multiplexed with each aperture open independently.

Figure 2A:
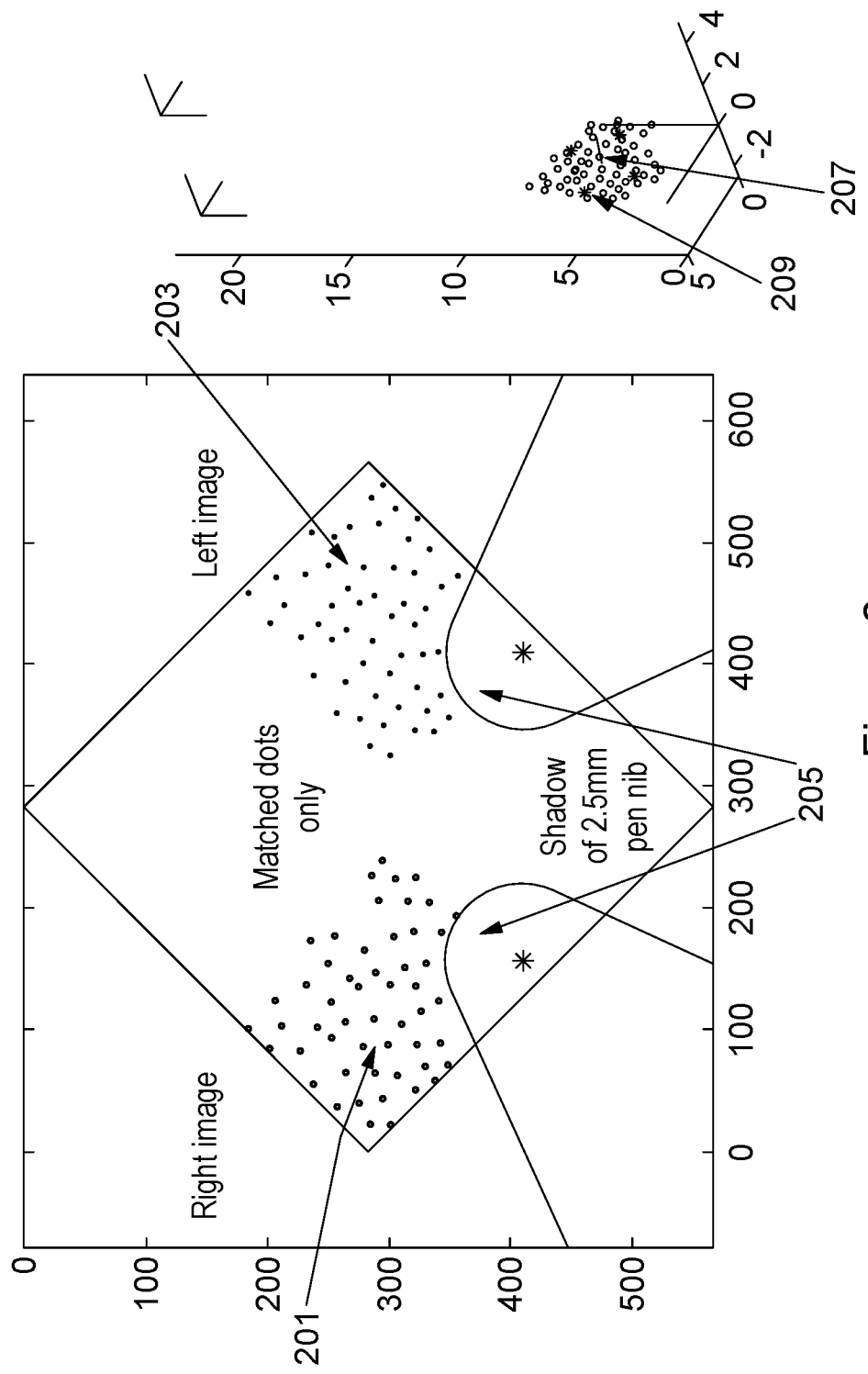
FIG. 2a is a schematic representation of a stereo dot pattern projection according to an example.

FIG. 2a is a schematic representation of a stereo dot pattern projection according to an example. The simulated dot projection of FIG. 2a is based on the image sensor geometry described with reference to FIG. 1. That is, the simulated dot projection of FIG. 2a is based on a pen apparatus comprising two image sensors arranged on either side of the body of the pen apparatus. In this example each camera sensor has been rotated 45 degrees to allow the pen nib to be more central.

Figure 2B:
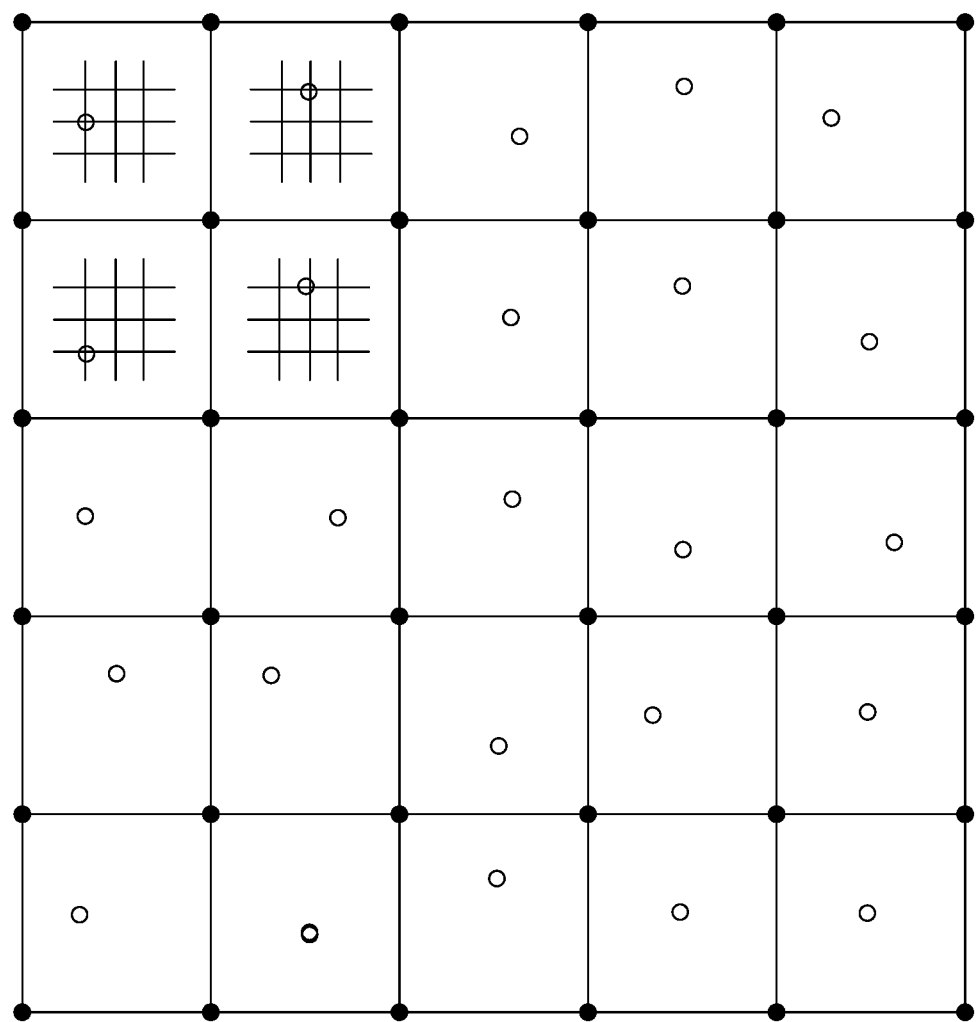
FIG. 2b is a schematic representation of a coded dot pattern grid according to an example.

In the example of FIG. 2a, dots on a planar surface are positioned on a 300 dpi world grid with each dot on a nominal 6×6 grid spacing, as depicted in FIG. 2b. The location of each (data) dot is then perturbed on a 3×3 grid (see FIG. 2b for example) to encode data (randomly in this case). FIG. 2a superimposes dots 201 from a left image (captured using image sensor 117 for example) and dots 203 from the right image (captured using image sensor 119 for example) into a single image space, showing also the corresponding location of a 2.5 mm diameter pen apparatus nib 205 relative to these two images. Dots that correspond between the two (left and right) views are shown in FIG. 2a.

In practice, captured images will be processed, using SOC 123 for example, to recover the patterns of dots in each view prior to stereo processing using standard dot detection techniques. For example, dots can be identified at the maxima and/or minima of difference of Gaussian (DoG) processed images. These are band pass processed images constructed by smoothing the captured image at 2 spatial frequencies using Gaussian kernels with different scales sigma_1 and sigma_2. The exact values of sigma_1 and sigma_2 will depend on the resolution of the sensor and the size of the physical dots in the dot pattern.

The dots 201 and 202 are shown reconstructed into the world, based on the known (by design or through calibration) camera geometry, in the right-hand part of FIG. 2a. Also shown in this right-hand section are a surface normal 207 and a set of four virtual dots 209 constructed to form a square on the planer surface that, in an example, has been least squares fitted through the reconstructed dots. According to an example, the dots 209 are determined by constructing two orthogonal direction vectors that form a coordinate frame that lies in the recovered planar surface and displacing the dots a prescribed distance (such as 2 mm for example) along the axis of this coordinate frame. By once again using the camera geometry information these dots can be projected back into either the left and/or right-hand images (dot patterns).

Figure 3:
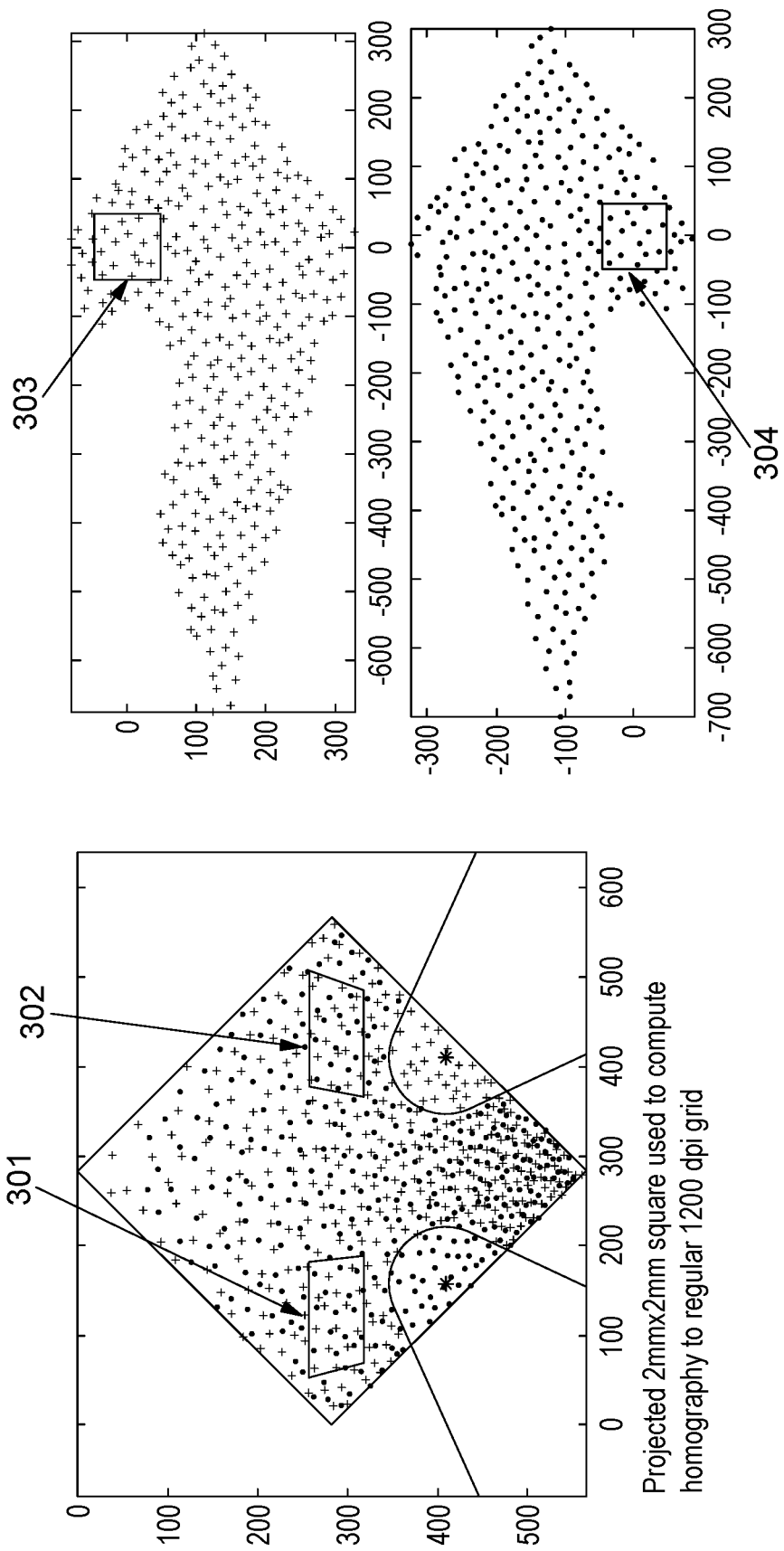
FIG. 3 is a schematic representation of a rectified pair of images according to example.

FIG. 3 is a schematic representation of a rectified pair of images according to example. Projected quadrilaterals 301 and 302 corresponding to the four virtual dots 209 are shown in the left-hand portion of this figure. The homography that results from the so projected points to nominal 2D coordinate frames for the left and right images provides a straight forward way to rectify (remove the perspective and scale distortion of) the captured dot patterns. These are shown to the right-hand side of FIG. 3 for each of the left (at the bottom) and right (at the top) images/dot patterns. In each case the homography is based on the relation between the projected quadrilaterals 301 and 302 and their respective nominal known counterparts 303 and 304 which define the geometry of the rectified image space in the 600 dpi units of the original printed page, which can be calculated using the SOC 123 for example. In the example shown the 2 mm displaced dots in the world correspond to 47.244 displacements in a 600 dpi coordinate frame. In an example, SOC 123 can use the homography defined by the transformation from projected quadrilateral to the respective nominal square to project the dots in the corresponding image and not just those from the overlap region. Note that each rectified dot pattern has an arbitrary rotation including a 90-degree rotation with respect to the original dot images shown on the left-hand side of FIG. 3.

With reference to FIG. 2a, the overlap region of the left and right images is partial for the geometry of the pen apparatus as described with reference to FIG. 1. If the full range of allowed orientation and position (including hover) of a pen apparatus relative to the plane of a dot pattern on a surface is considered, a limited region, close to the nib in either image, will lie in the overlap region for all possible situations. Thus, according to an example, there is provided a method that exploits the fact that a single plane is being fitted growing from a region close to the nib of the pen apparatus (or some other fixed point of reference).

According to an example, a method for recovering perspective distortion of a coded dot pattern on a surface thus comprises generating a stereo-pair of images of a portion of the coded dot pattern. The stereo-pair of images comprise an overlap region comprising a subset of dots of the coded dot pattern that are common to the stereo-pair of images.

Figure 4:
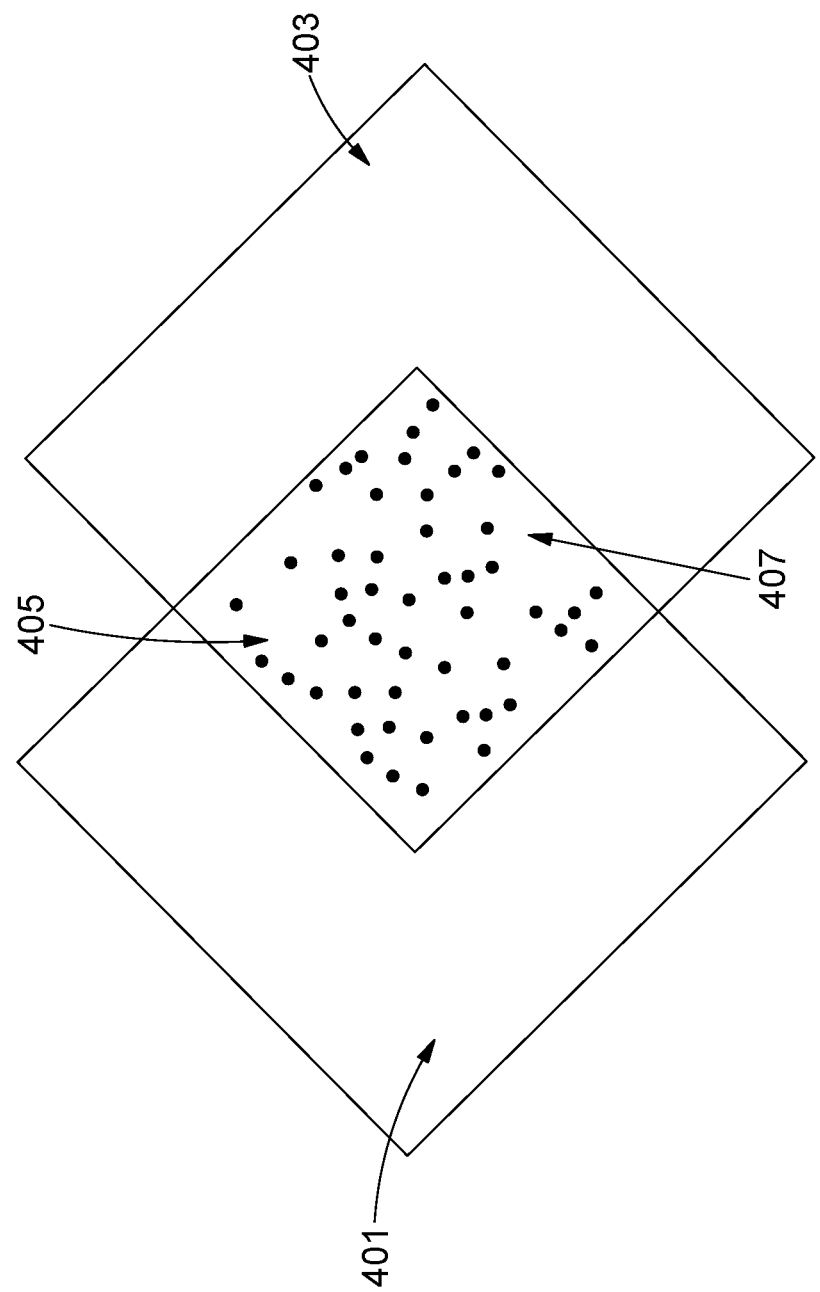
FIG. 4 is a schematic representation of the field of view of image sensors according to an example.

Referring to FIG. 1 for example, the field of view of each of the image sensors 117, 119 is depicted schematically in FIG. 4. The field of view 401 of the image sensor 117 overlaps the field of view 403 of the image sensor 119 by an overlap region 405. Accordingly, when imaging a surface comprising a coded dot pattern there will be a subset of dots 407 of the coded dot pattern that are common to the stereo-pair of images generated using the image sensors 117, 119, i.e. the subset of dots 407 lies within the overlap region 405. In an example, the subset of dots 407 can comprise a dot or multiple dots.

Figure 5:
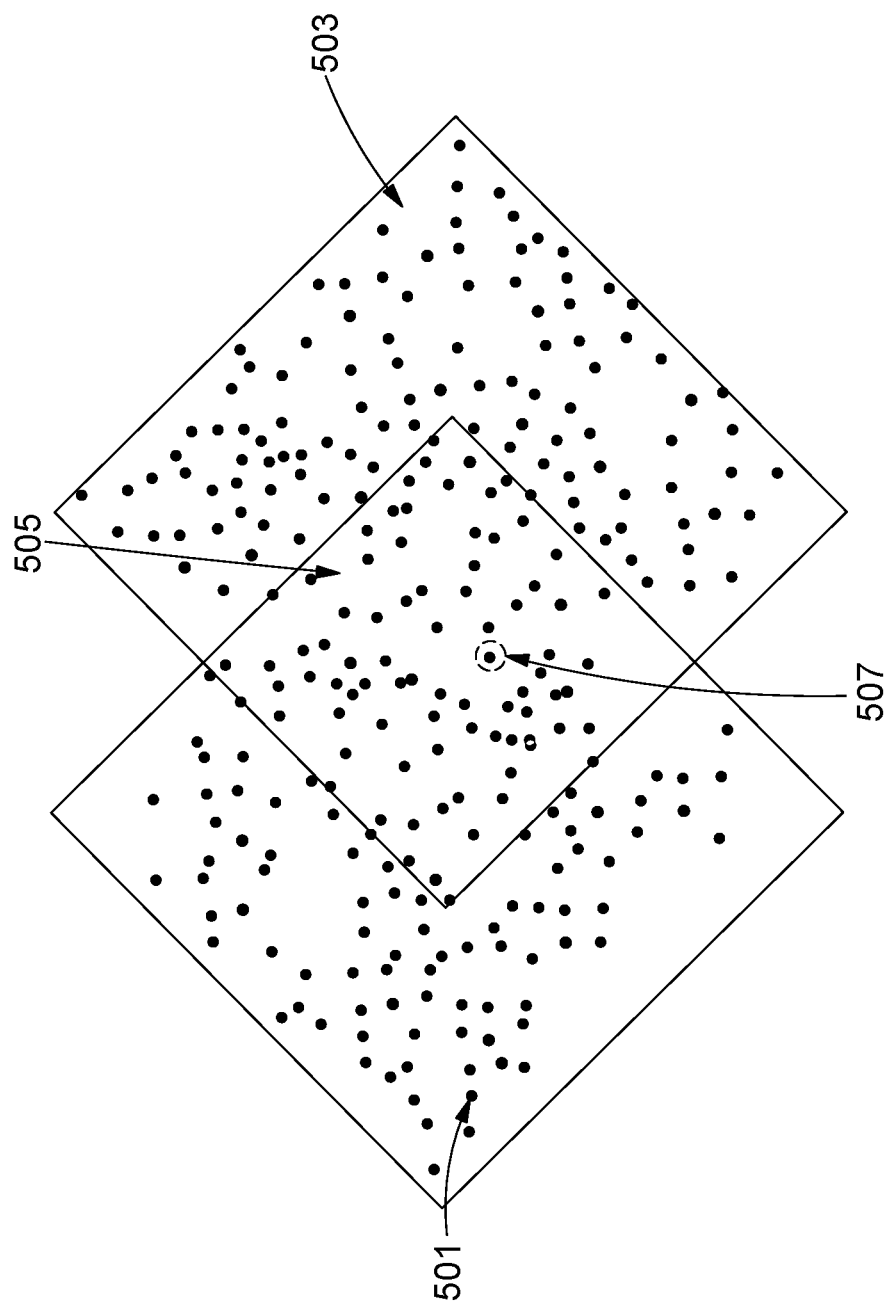
FIG. 5 is a schematic representation of a stereo pair of images of a portion of a coded dot pattern according to an example.

FIG. 5 is a schematic representation of a stereo pair of images of a portion of a coded dot pattern according to an example. In the example of FIG. 5, the left image 501 from the image sensor 117 and the right image 503 from the image sensor 119 have an overlap region 505 as described above. Within this overlap region, there are a subset of dots of the coded dot pattern that are common to the stereo-pair of images 501, 503. Note that FIG. 5 does not show the reference grid of dots, but shows data dots. In one image of the stereo-pair of images, such as image 501 for example, a focus pattern 507 is selected from the subset of dots within region 505. The focus pattern can comprise a dot or multiple dots. In the example of FIG. 5, one dot is selected as the focus pattern 507. Thus, in an example, the focus pattern comprises a small number (such as a dot or multiple dots) of strong dots (focus dots) that are strategically positioned close to the projected position of the pen nib (or other contact probe) such that they always lie in the overlap region (either individually or in unison) for all possible alignments of the pen. SOC 123 can select a focus pattern that is positioned close to the nib of the pen apparatus and which is composed of a dot (or multiple dots) that are strongly identified. That is, for example, the selected dot or dots can be within a predetermined region around the nib that have a measured characteristic (such as contrast, width, proximity to nib and so on) above a predetermined threshold.

As will be described in more detail below, a set of potential matches for the focus pattern 507 is then determined, using SOC 123 for example, in the other image 503 of the stereo-pair of images. That is, for each focus pattern, its potential matches to dots in the right (or left) image are considered, constrained by a range of possible disparity (difference in displacement in the left and right images) and the epipolar constraint which uses the camera geometry to reduce the 2D matching problem to a 1D search along a single epipolar line (modulo the precision of the calibration process and dot location precision). In particular, when the cameras have the same focal length and are arranged in a parallel arrangement perpendicular to the baseline between the optical centres, the epipolar lines become horizontal and the search for all matching dots is thus limited to those with the same or similar vertical displacements. Furthermore, any arbitrary camera geometry can be converted to an equivalent parallel camera geometry through a 2D reprojection of each image space based on the known camera parameters (usually recovered by calibration).

For each potential match, a set of additional dots of the coded dot pattern consistent with a single plane is selected by SOC 123. Thus, for each potential focus pattern match other supporting dot matches from the left to right images (dot patterns) that are consistent with a single plane consistent with the original focus dot match are determined.

Using these, a single plane with the highest number of consistent matched dots can be determined. This means that the best supported plane in terms of the sum of individual recovered consistent dot matches is selected as the solution to the stereo problem. In practice, for parallel camera geometries, it is convenient to construct a disparity space based on one or other image or preferably a central projection. That is, for example, a 3-dimensional coordinate frame XYD where X and Y are defined by the mean x and y position of the matching dots and disparity D is the difference in the x position (left minus right or visa-versa). Planes in 3D space correspond to planes in this constructed space and hence matched dots are not projected into real world 3D coordinates in order to determine the degree of within plane support.

FIG. 6 is a schematic representation illustrating a focus pattern and its evolving context for support resulting in efficient within disparity-plane support recovery according to an example. The dots shown in FIG. 6 have been transformed to a rectified parallel camera that is equivalent to the original camera geometry recovered during calibration. This means that dots will have the same Y location in each image (modulo the dot finding precision), or in other-words the epipolar constraint becomes a horizontal epipolar constraint.

The process for efficient disparity plane recovery begins at the most immediate region of interest around the focus pattern 601. For example, dots within a predetermined radius of the focus pattern 601 can initially be selected by SOC 123. Strongly supported disparity planes over this neighbourhood (perhaps one for example) are put forward for the second process of iterative growth and refinement incorporating ever larger neighbourhoods (e.g. radii) of support (as depicted by the different styles of dots shown in FIG. 6 for example).

In the example of FIG. 6, the focus pattern 601 (which in this example comprises a single dot) resides in the overlap region of the left 605 and right 607 images and has a small set of possible matches in the right image 607 as determined by the allowed disparity range and the horizontal epipolar constraint depicted by line 609 along which potential matches are depicted. The context (planar support) for the best match is determined through a process of iterative refinement using ever-increasing regions of interest, as noted above. That is, for each potential match of the focus pattern 601 along the line 609, possible matches for dots within regions of interest around the focus pattern 601 are determined by SOC 123.

Figure 7A:
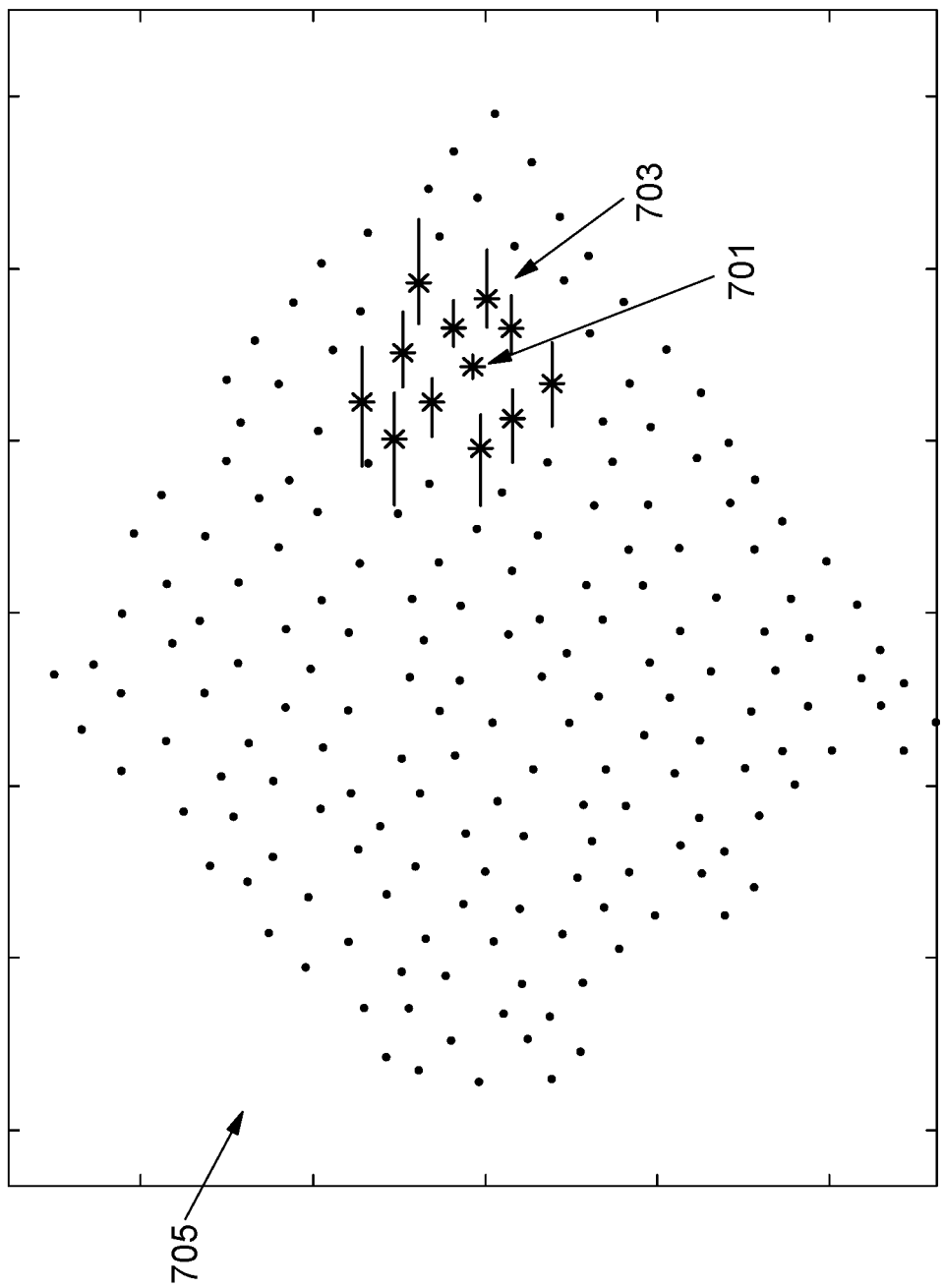

In this connection, FIGS. 7a-g are schematic representations of the initial disparity plane support process which uses the most immediate neighbourhood of the focus pattern, according to an example. FIG. 7a depicts a dot template from a left image 705 generated using, for example, image sensor 117 of the pen apparatus of FIG. 1, and comprising a focus pattern dot 701 and a set of immediate neighbouring dots 703. If an upper limit on the relative orientation of the pen and the plane of dots is set (somewhere between 45 and 60 degrees for example) this implies a corresponding upper limit on the gradient of the disparity plane in a constructed disparity space can be set. This in turn allows imposition of a range of relative disparity between pairs of possible matches to be consistent with a within limit plane (this is referred to as a disparity gradient limit). Examples of these relative disparity ranges, with respect to the focus dot, 701, are shown for each of the immediate neighbouring dots, 703, as solid lines. In an example, the dot matches are constrained to lie within these ranges with respect to matches of the focus dot, with the extent of the range growing with the displacement of the neighbouring dot from the focus dot. These dots (703) are compared in turn for each possible match of the focus feature in the corresponding right image (generated using, for example, image sensor 119 of the pen apparatus of FIG. 1) to enable a within gradient limit support score to be calculated, which represents the number of consistent dot matches in the right-hand image 707 shown in FIGS. 7b-g.

Figure 7C:
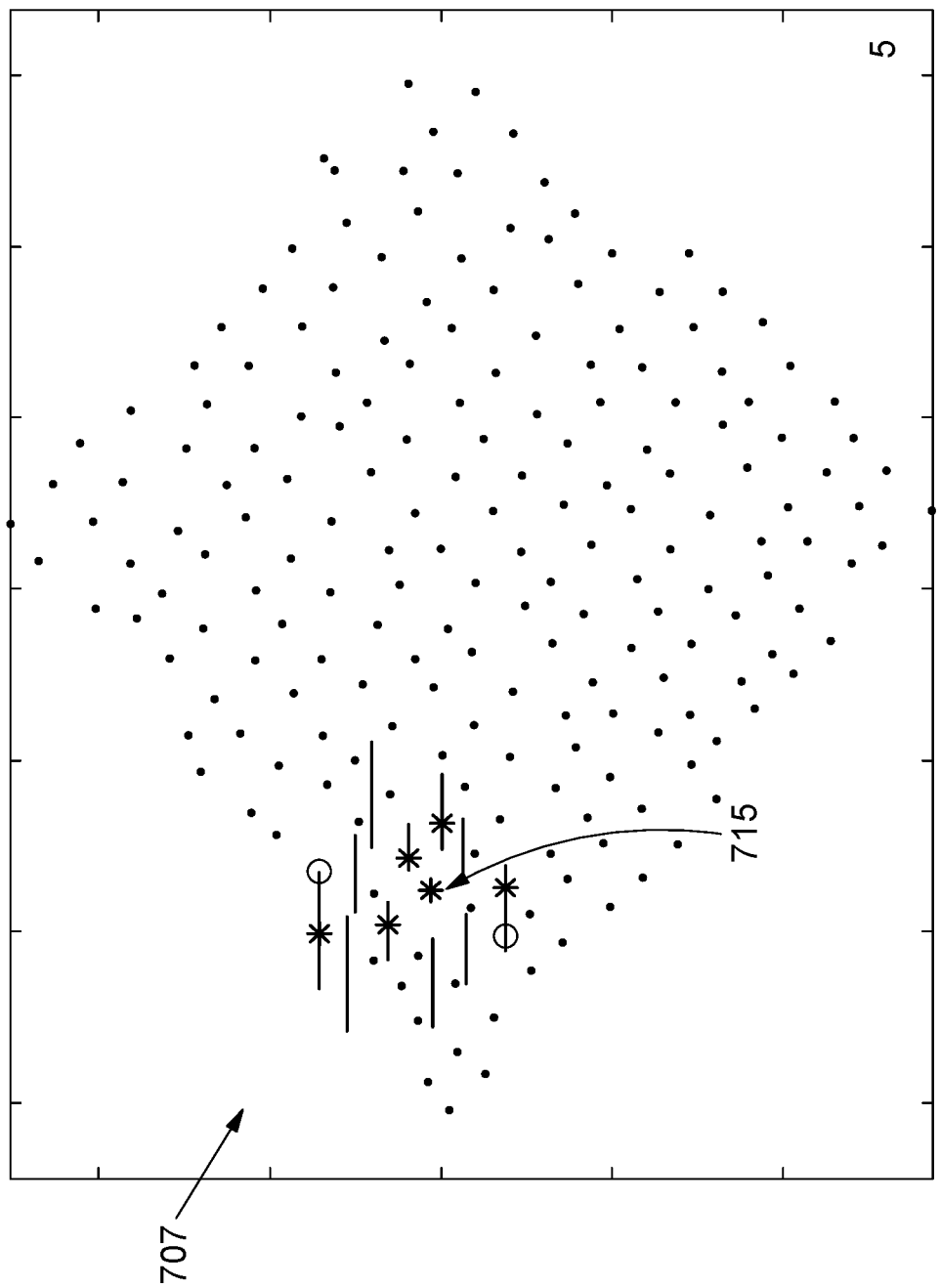
Figure 7D:
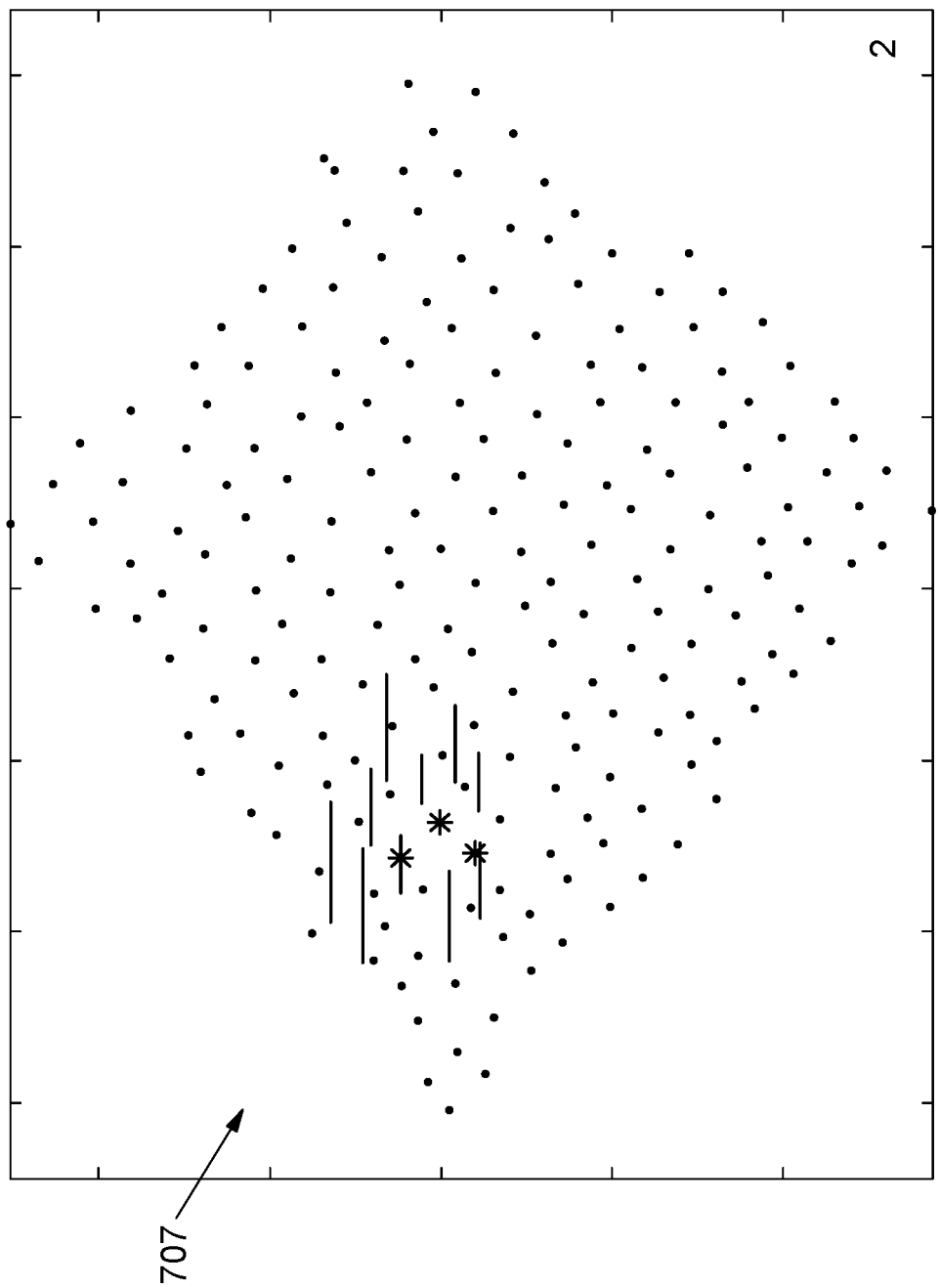
Figure 7E:
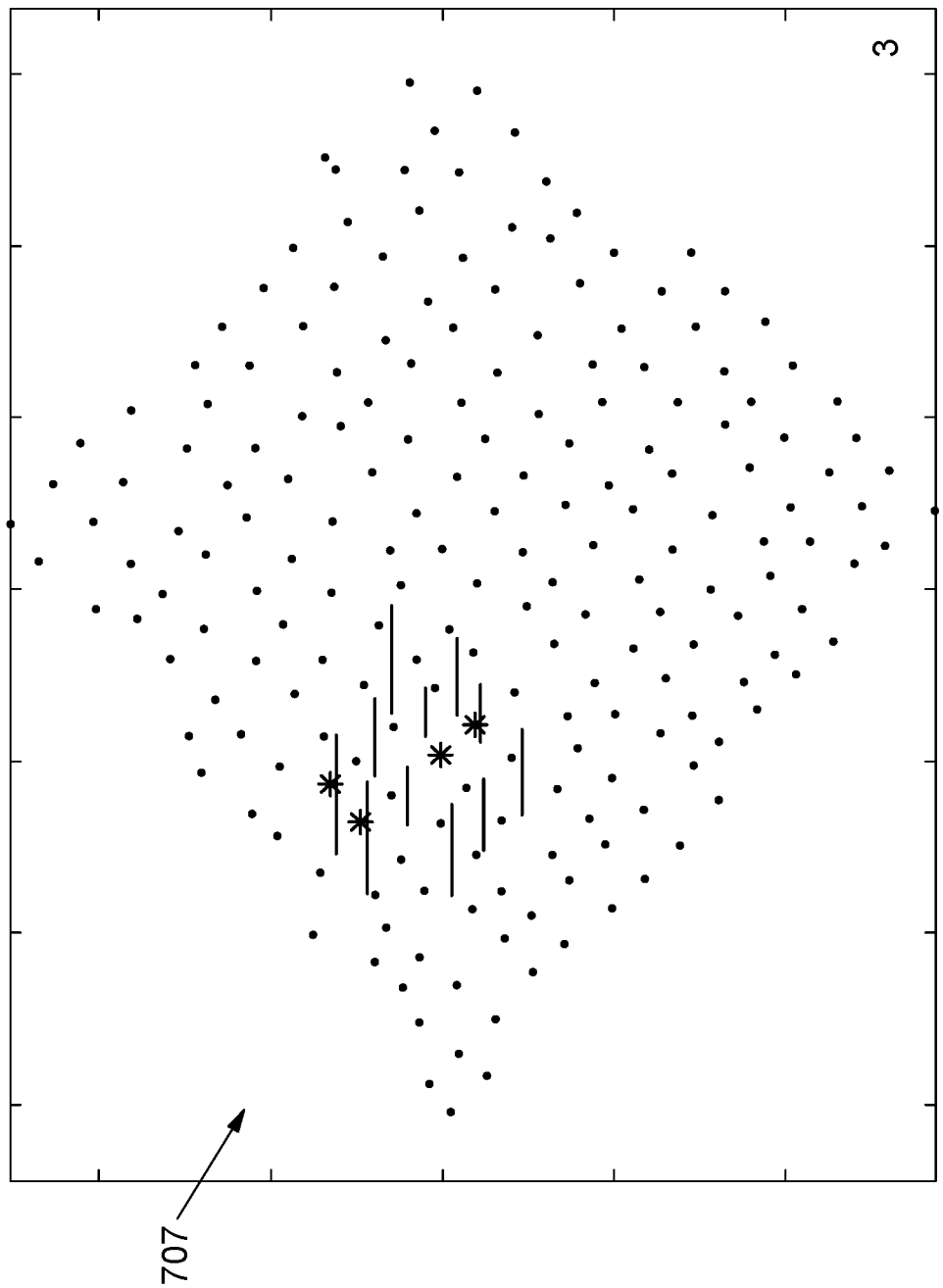
Figure 7F:
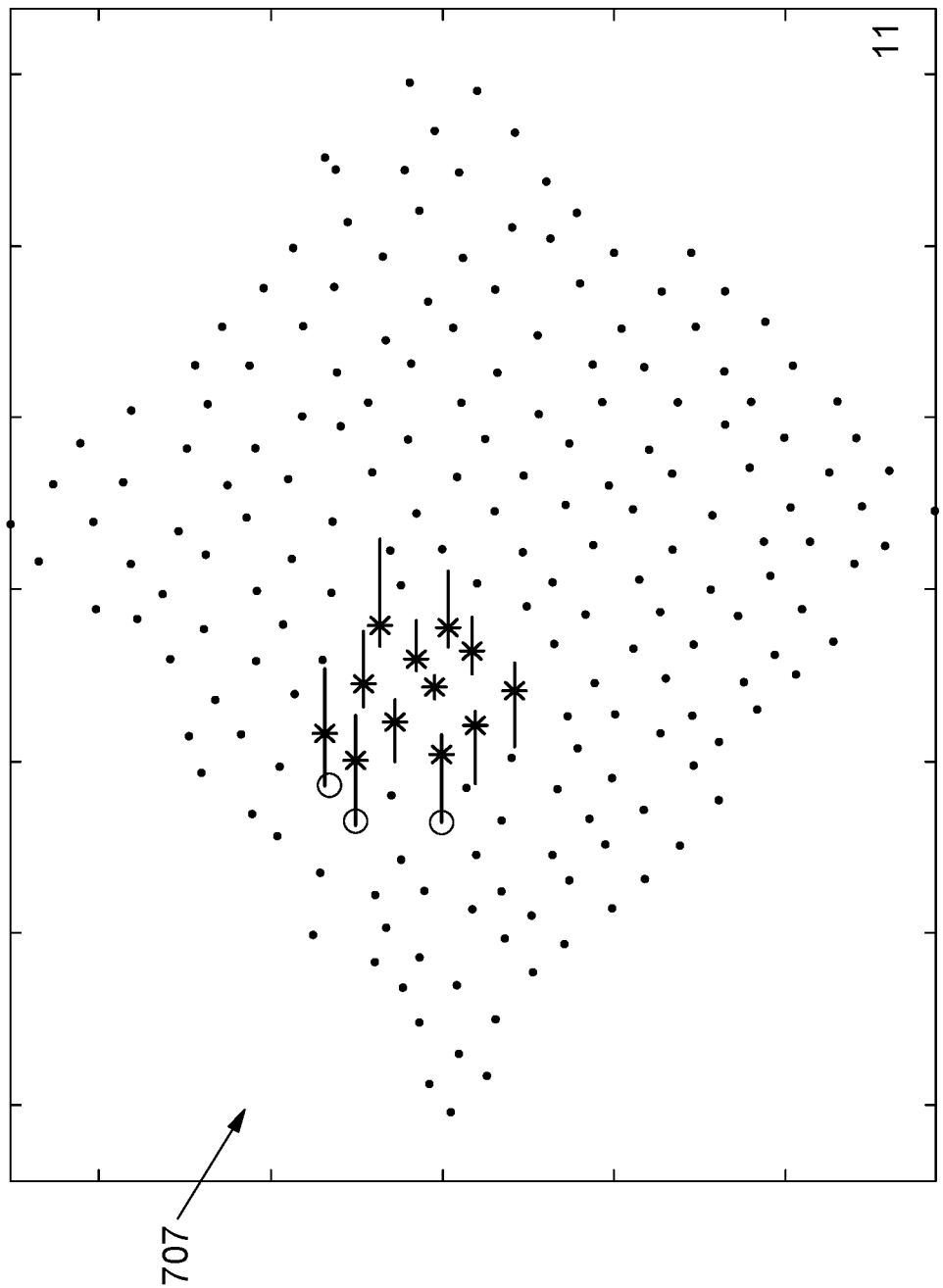
Figure 7G:
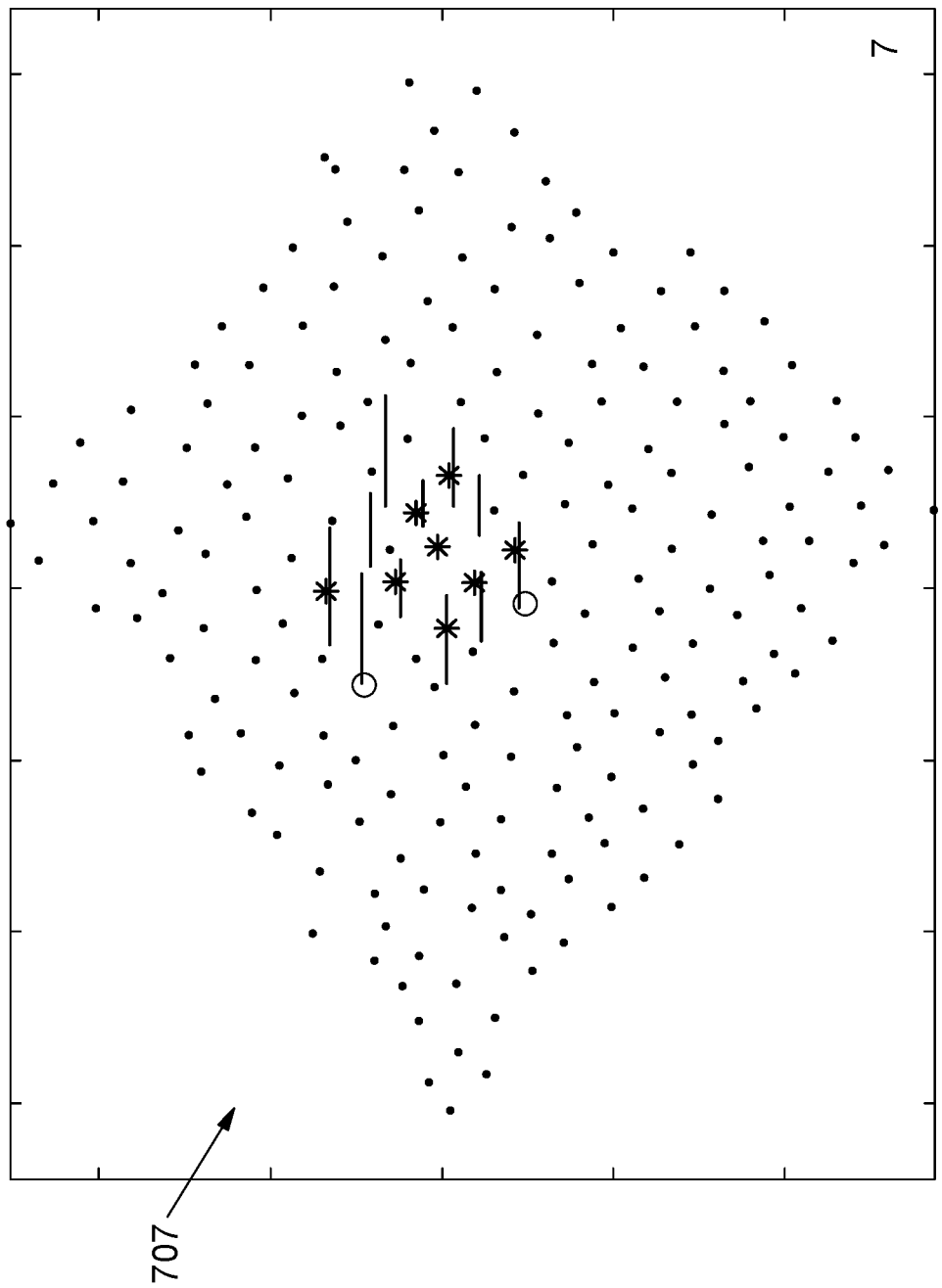

For example, in FIG. 7b, based on a possible match 709 (for focus pattern 701 of FIG. 7a) that lay close to the horizontal epipolar line (see for example FIG. 6), one consistent match 710 can be found. This is, in essence, a flexible template that accumulates support from neighbourhood dots that lie within a disparity gradient limit. In this example the number of consistent supporting dots for each match of the focus feature is indicated at the bottom right of the relevant sub FIG. 7*b*-*g*. So in the example of FIG. 7*b*, one consistent match is found. In FIG. 7*c*, 5 consistent matches are found using the possible match 715, and so on across FIGS. 7*d*-*g*.

In an example, consistency is further enforced by removing in turn the support from those neighbouring dot matches that are most in conflict (violating the pairwise disparity gradient limit) with others in the neighbourhood. In the example of FIGS. 7*b*-*g* consistent neighbourhood dot matches are shown in as stars, while those that have been eliminated due to conflict are shown as unfilled circles. In an example, iterative refinement continues by fitting a plane through the current set(s) of consistent matched dots using robust least squares in the constructed disparity space. Further matches, consistent with the fitted plane, are then sought from a next larger neighbourhood. This can be repeated until all dots in the left (or right) image have been exhausted. The best such consistent plane of matched dots is chosen.

FIG. 8 is a schematic representation of the final selected sets of corresponding dots consistent with a single plane and the reconstructed depth plane with respect to a Euclidean world coordinate frame according to an example.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, SOC 123) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 9:
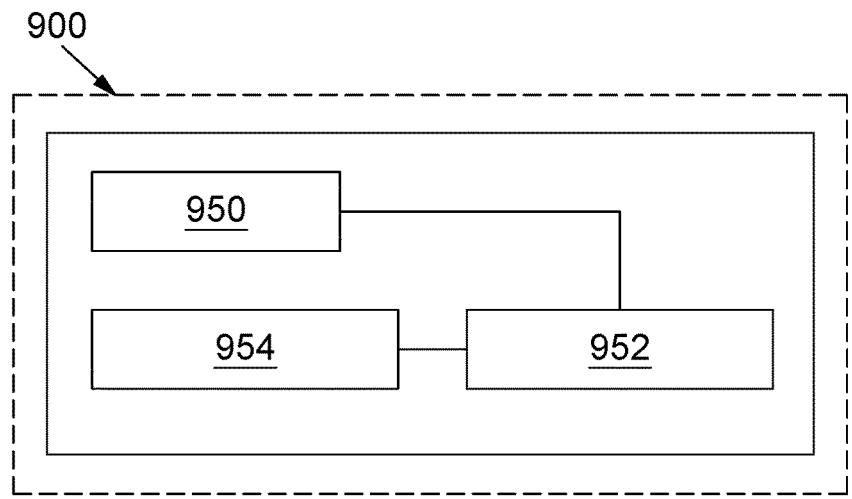
FIG. 9 shows an example of a processor associated with a memory according to an example.

FIG. 9 shows an example of a processor 950 associated with a memory 952 of an apparatus 900, such as a pen apparatus as depicted in FIG. 1 for example. The memory 952 comprises computer readable instructions 954 which are executable by the processor 950. The instructions 954 comprise instructions to: select a focus pattern from a subset of points within an overlapping region of a pair of images of a coded pattern; generate a set of potential matches for the focus pattern in one of the images; compare the disposition of elements of the coded pattern around respective ones of the potential matches with a corresponding disposition of elements of the coded pattern in a predetermined area around the focus pattern in the other of the pair of images; and select one of the potential matches with a largest number of elements of the coded pattern matching those within the predetermined area around the focus pattern.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

Figure 10:
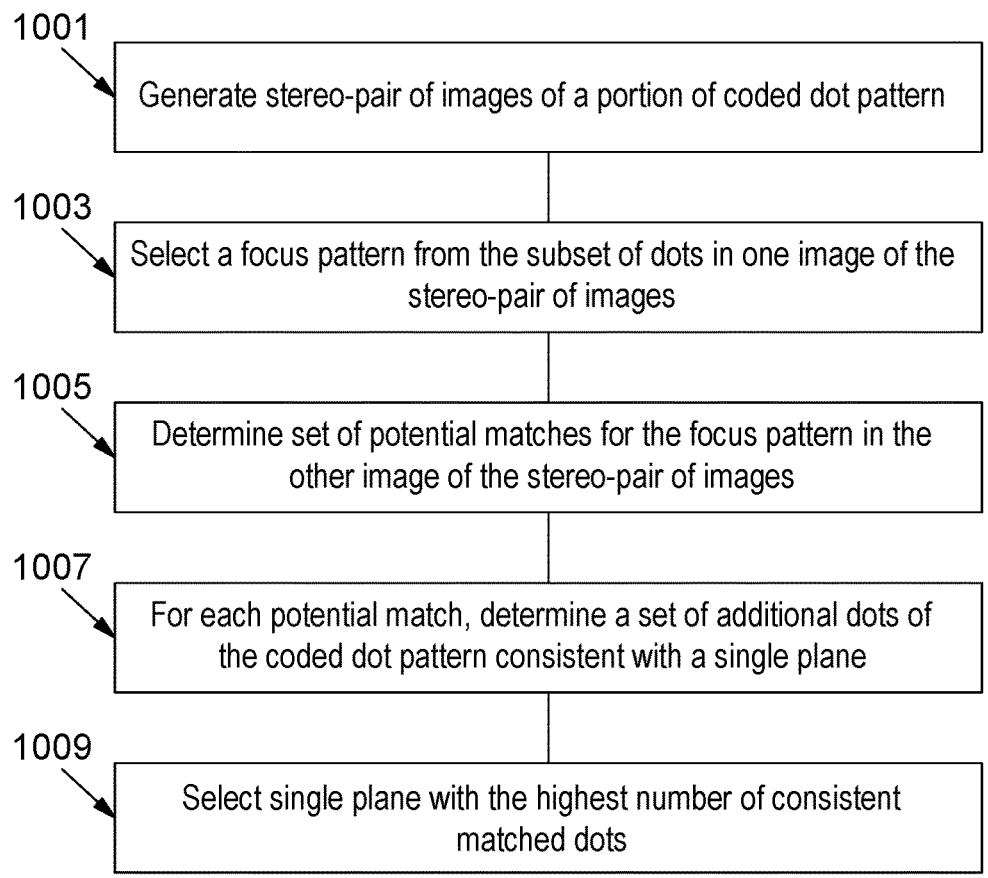
FIG. 10 is a flowchart of a method according to an example.

FIG. 10 is a flowchart of a method for recovering perspective distortion of a coded dot pattern on a surface according to an example. In block 1001 a stereo-pair of images of a portion of the coded dot pattern are generated. The stereo-pair of images comprising an overlap region comprising a subset of dots of the coded dot pattern that are common to the stereo-pair of images. In block 1003 a focus pattern from the subset of dots is selected in one image of the stereo-pair of images. In block 1005, a set of potential matches for the focus pattern in the other image of the stereo-pair of images is determined. In block 1007, for each potential match, a set of additional dots of the coded dot pattern consistent with a single plane is determined. In block 1009, a single plane with the highest number of consistent matched dots is selected.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for recovering perspective distortion of a coded dot pattern on a surface resulting from a digital stylus being located at a non-right angle to the surface, comprising:
    capturing a stereo-pair of images of a portion of the coded dot pattern using an image sensor of the digital stylus, the stereo-pair of images captured from opposing sides of the digital stylus, the stereo-pair of images comprising an overlap region comprising a subset of dots of the coded dot pattern that are within both of the stereo-pair of images;
    selecting, in one image of the stereo-pair of images, a focus pattern from the subset of dots within the overlap region within both of the stereo-pair of images;
    determining a set of potential matches for the focus pattern in the other image of the stereo-pair of images;
    for each potential match, determining, in the other image of the stereo-pair of images, a set of additional dots of the coded dot pattern consistent with a single plane; and
    selecting the single plane of the potential match with a highest number of additional dots to recover the perspective distortion of the coded dot pattern on the surface resulting from the digital stylus being located at the non-right angle to the surface.

2. The method of claim 1, wherein determining the set of potential matches for the focus pattern comprises:
    using a set of dots within a predetermined region around the focus pattern.

3. The method of claim 2, wherein determining the set of potential matches for the focus pattern further comprises:
    iteratively growing the predetermined region to encompass an increasing neighborhood of dots.

4. The method of claim 1, wherein determining the set of potential matches for the focus pattern in the other image of the stereo-pair of images comprises:
    selecting multiple dots falling along a horizontal epipolar line projected, in the other image, at a vertical position corresponding to the vertical position of the focus pattern.

5. A digital stylus comprising:
    an image sensor to capture a stereo-pair of images of a portion of a coded pattern on a surface; the stereo-pair of images captured from opposing sides of the digital stylus, the stereo-pair of images comprising an overlap region comprising a subset of dots of the coded dot pattern that are within both of the stereo-pair of images; and
    a processor to:
        select, in one image of the stereo-pair of images, a focus pattern from the subset of dots within the overlap region within both of the stereo-pair of images;
        determine, for each of a set of potential matches for the focus pattern in the other image of the stereo-pair of images, a set of additional dots of the coded pattern in the other image of the stereo-pair of images that are consistent with a single plane and based around a set of potential matches for the focus pattern; and
        select the single plane of the potential match with a highest number of additional dots to recover perspective distortion of the coded dot pattern on the surface resulting from the digital stylus being located at a non-right angle to the surface.

6. The digital stylus of claim 5, wherein the image sensor comprises a single image sensor to capture the stereo-pair of images of the portion.

7. The digital stylus of claim 5, wherein the image sensor structure comprises a pair of image sensors to capture respective ones of the stereo-pair images of the portion.

8. The digital stylus of claim 7, wherein the pair of images sensors are disposed on generally opposite sides of the digital stylus.

9. The digital stylus of claim 5, further comprising a source of near infra-red radiation to illuminate the surface.

10. The digital stylus apparatus as claimed in of claim 6, the processor to use two overlapping regions of the image sensor to capture the stereo-pair of images.

11. The digital stylus of claim 5, further comprising a prism or semi-reflective mirror to reflect a portion of the coded pattern on the surface to the image sensor structure.

12. The digital stylus of claim 5, further comprising a nib, the processor to select the focus pattern from a region of the coded pattern in a vicinity of the nib.

13. A non-transitory machine-readable storage medium encoded with instructions executable by a processor to:
    capture a stereo-pair of images of a portion of a coded dot pattern on a surface using an image sensor of a digital stylus located at a non-right angle to the surface, the stereo-pair of images captured from opposing sides of the digital stylus, the stereo-pair of images comprising an overlap region comprising a subset of dots of the coded dot pattern that are within both of the stereo-pair of images;
    select, in one image of the stereo-pair of images, a focus pattern from the subset of dots within the overlap region within both of the stereo-pair of images;
    generate a set of potential matches for the focus pattern in the other image of the stereo-pair of images;
    for each potential match, determine, in the other image of the stereo-pair of images, a set of additional dots of the coded dot pattern consistent with a single plane; and
    select the single plane of the potential match with a highest number of additional dots to recover perspective distortion of the coded dot pattern on the surface resulting from the digital stylus being located at the non-right angle to the surface.

14. The non-transitory machine-readable storage medium of claim 13, wherein the instructions are executable by the processor to generate the set of potential matches for the focus pattern in the other image by:
    iteratively enlarging a predetermined region around the focus pattern to encompass an increasing neighborhood of dots.

15. The non-transitory machine-readable storage medium of claim 13, wherein the instructions are executable by the processor to generate the set of potential matches for the focus pattern in the other image by:
    selecting multiple dots falling along a horizontal epipolar line projected, in the other image, at a vertical position corresponding to the vertical position of the focus pattern.

16. The method of claim 1, wherein the digital stylus is a digital pen or an opto-electronic pen.

17. The digital stylus of claim 5, wherein the digital stylus is a digital pen or an opto-electronic pen.

18. The non-transitory machine-readable storage medium of claim 13, wherein the digital stylus is a digital pen or an opto-electronic pen.

* * * * *